Jan. 6, 1959  K. G. F. MOELLER  2,867,130

MEANS FOR REDUCING GEAR NOISE

Filed Oct. 5, 1954

INVENTOR.
KURT G. F. MOELLER
BY George Sipkin
B. L. Zangwill
ATTORNEYS 2,867,130
Patented Jan. 6, 1959

2,867,130

MEANS FOR REDUCING GEAR NOISE

Kurt G. F. Moeller, Annapolis, Md.

Application October 5, 1954, Serial No. 460,522

6 Claims. (Cl. 74—443)

(Granted under Title 35, U. S. Code (1952), sec. 266)

The invention described herein may be manufactured and used by or for the Government of the United States of America for governmental purposes without the payment of any royalties thereon or therefor.

The present invention relates to reduction of gear noise and more particularly to a device attached to meshing gears for damping the noise produced when gear teeth contact one another during gear operation.

The problem of reducing gear noises produced by meshing gears has resulted in efforts towards improving the design of gear teeth. Such design involved changes in tooth form and in the spacing, aligning and concentricity of the teeth and by keeping all other geometrical parameters at the highest possible accuracy. This high accuracy reduces the noise appreciably, but it cannot prevent the stress wave produced by the loading and unloading of the tooth.

Therefore it is common practice in machinery noise control to insulate the rest of noise, which is unavoidable, by providing flexible mounts and sound-absorbing covers for the gear unit. Nevertheless the most desirable procedure is to cure the evil at the source. Designers of gears have resorted to substituting non-metallic material and metallic materials of different hardness in the gear teeth, and further, bands or rings of sound absorbing material have also been incorporated in the body of the gears or gear shafts for deadening the noises made by the meshing gears in a gear train. None of the above-mentioned gear modifications have been sufficiently effective in controlling such noises however, since the substitution of materials limits the load carrying capacity of the gears and the addition of sound absorbing material in the gear body adds weight without achieving commensurate results.

The present invention eliminates the above-described deficiencies by mounting either a single or pair of discs on each of the gear shafts supporting meshing gears. The discs are positioned on the gear shafts in parallel relationship with the gears and in rolling contact with one another, and either one or both of the discs are provided with compliant material on the disc periphery. This structure is capable of damping out, through friction between the discs, the natural frequencies of vibration of the toothed gears caused by tooth contact, friction due to imperfect teeth between the gears and other complex forces produced by operation of the toothed gears.

It is an object of the invention to provide sound deadening means for reducing the noise output of moving parts.

Another object of the invention is the provision of a parallel arrangement of gears and discs for reducing noise effects produced by the gears.

A further object of the invention is to provide sound damping discs on the shafts of revolving gears for reducing the noise generated by the meshing gears.

A still further object of the invention is the provision of compliant material between gears and sound absorbing discs for compensating for bearing clearances of gears and for providing sufficient friction on the contact area.

Other objects and many of the attendant advantages of this invention will be readily appreciated as the same becomes better understood by reference to the following detailed description, when considered in connection with the accompanying drawings, wherein.

Figure 1:
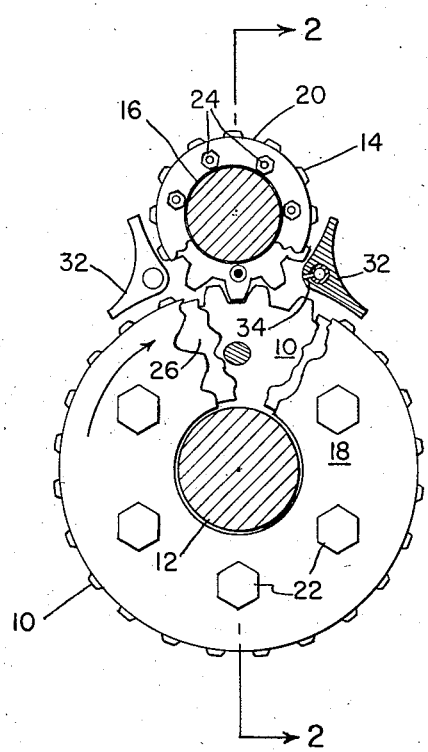
Figure 1 is a view in elevation, partly in section, showing a meshing bull and pinion gear including sound absorbing discs attached thereto.
Figure 2:
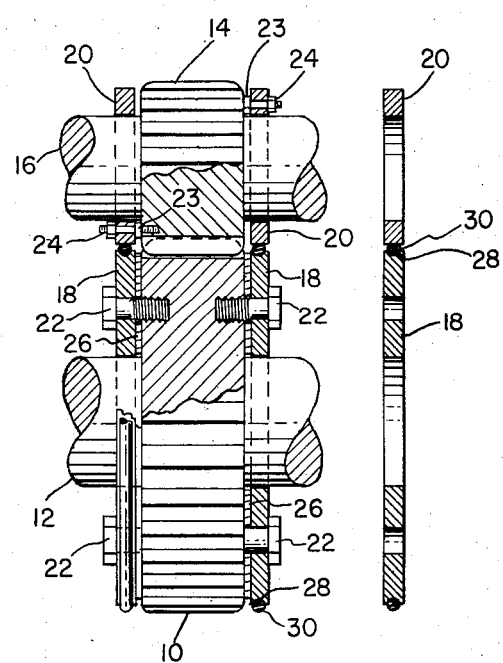
Figure 2 is a cross-sectional view in elevation taken on lines 2—2 of Figure 1.
Figure 3:
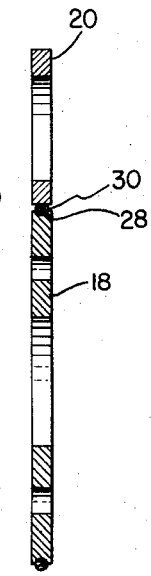
Figure 3 is a cross-sectional view in elevation of a pair of mating discs of the invention.

Referring now to the drawings wherein like reference characters designate like or corresponding parts throughout the several views, there is illustrated in Figure 1, a bull gear 10 having a shaft 12 shown as being in mesh with a pinion gear 14 mounted on shaft 16. A pair of discs 18 and 20 are respectively mounted on shafts 12 and 16 on opposite sides of each gear and are attached to the gears by means of bolts 22 and 24. Interposed between the side of gear 10 and the inner face of discs 18 are damping sheets 26 of suitable material, such as lead or asbestos. The periphery of disc 18 is preferably provided with a groove 28 for receiving an elastic ring 30 of rubber or plastic material.

Wedge type guards 32 positioned on the in-mesh and out-mesh sides of the gears protect the gears from damage in the event the elastic rings wear out and become disengaged from the discs. Where forced lubrication is utilized for the gears, passageways 34 may be provided in the guards for directing lubricant onto the gears thereby eliminating special equipment needed for this purpose.

It will be apparent to those skilled in the art that the damping sheets 26 may also be alternatively positioned between pinion gears 14 and its attached discs 20. In some installations, including this invention, it would not be feasible to position discs on both sides of a gear; in such event, only one disc on each gear is necessary to achieve an appreciable damping effect. Further, the elastic ring 30 is illustrated herein as being in a groove provided in the bull gear discs 18. Obvious modifications of the latter are possible; for example, the discs 20 could carry the elastic ring or both pairs of discs 18 and 20 could be provided with such rings.

The principal advantages achieved by the invention is that the vibrational motions of the gears are damped by the rubber edged discs by means of external friction and by the sheets of lead or asbestos by internal friction or absorption. The shock transmitted to the gears by tooth contact causes torsional vibration which makes the rotational motion non-uniform to a certain extent. This relative motion between the bull gear and pinion will be counteracted by the friction provided by the contact rings with the result that at least part of the energy will be transformed into heat. There are also variations in the radial forces acting between bull gear and pinion caused in part, by error in tooth form. These varying forces of non-periodic character lead to radial motions of the shafts in the bearings resulting in irregular impacts which excite oscillations of casings and other elements. These oscillations will also be damped by the contact rings.

Obviously, many modifications and variations of the present invention are possible in light of the above teachings. It is therefore to be understood that within the scope of the appended claims the invention may be practiced otherwise than as specifically described.

What is claimed is:

1. A damping device comprising, a first rotatable member, a second rotatable member engaging said first member, vibration damping means respectively affixed to each of said members, the damping means on one rotatable member being in frictional contact with the damping means on the other rotatable member, and vibration absorbing means interposed between one of said rotatable members and the vibration damping means affixed thereto, whereby vibrations generated by said interengaged rotatable members are absorbed by said absorbing means and said vibration damping means.

2. A damping device comprising, a pair of meshing toothed gears mounted on separate shafts, meshing frictional gears surrounding said shafts and connected with said toothed gears and being positioned in parallel relationship therewith, insulating means between at least one of said toothed gears and said frictional gears, elastic means on a rim of at least one of said frictional gears for absorbing vibrations produced in said gears, and gear protecting guards mounted adjacent the in-mesh side of said toothed gears for preventing the introduction of foreign material into said gears.

3. The combination according to claim 2 wherein said protective guards include means for providing a path for lubricant to said gears.

4. A damping device comprising, a first movable member, a second movable member engaging said first member, and vibration damping members respectively positioned in parallel relationship with and attached to each of said movable members, said damping members being in juxtaposed, spaced relationship to one another; a resilient member interposed between, and in contacting relationship with, said damping members, whereby vibrations are absorbed by means of external friction when said first and second movable members are moved relative to one another.

5. A damping device comprising a pair of meshing toothed gears, a plurality of meshing frictional gears respectively surrounding shafts supporting said toothed gears, said frictional gears comprising a pair of discs, and resilient means between said discs for damping vibrations, connecting means respectively attaching said frictional gears to and in parallel relationship with said toothed gears, whereby vibrations produced by said toothed gears causes frictional motion in said frictional gears thereby transforming vibrational energy into heat.

6. The combination according to claim 5 wherein damping sheets separate the toothed gear from said frictional gears mounted on the same shaft.

References Cited in the file of this patent

UNITED STATES PATENTS

| | | |
|---|---|---|
| 405,759 | Benson | June 25, 1889 |
| 453,630 | Evans | June 9, 1891 |
| 584,521 | Rich | June 15, 1897 |
| 849,949 | Weaver | Apr. 9, 1907 |
| 1,213,190 | Hatton | Jan. 23, 1917 |
| 1,399,329 | Vandercook | Dec. 6, 1921 |

FOREIGN PATENTS

| | | |
|---|---|---|
| 5,525 | Great Britain | Mar. 11, 1896 |
| 613,314 | France | Nov. 15, 1926 |
| 834,799 | Germany | Mar. 24, 1952 |